(12) United States Patent
Jeon

(10) Patent No.: US 9,234,816 B2
(45) Date of Patent: Jan. 12, 2016

(54) ENGINE TEST DEVICE

(71) Applicants: Hyundai Motor Company, Seoul (KR); Kia Motors Corporation, Seoul (KR)

(72) Inventor: Byung Sun Jeon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 105 days.

(21) Appl. No.: 14/097,182

(22) Filed: Dec. 4, 2013

(65) Prior Publication Data

US 2015/0001371 A1 Jan. 1, 2015

(30) Foreign Application Priority Data

Jul. 1, 2013 (KR) .................. 10-2013-0076716

(51) Int. Cl.
*G01M 15/00* (2006.01)
*G01M 15/02* (2006.01)

(52) U.S. Cl.
CPC ..................... *G01M 15/02* (2013.01)

(58) Field of Classification Search
CPC .............................. G01M 15/02; B25H 1/0007
USPC ............. 269/71; 73/116.02, 116.04; 248/671
See application file for complete search history.

(56) References Cited

U.S. PATENT DOCUMENTS

| | | | | |
|---|---|---|---|---|
| 1,364,629 A * | 1/1921 | Grotendick | ...................... | 269/64 |
| 1,481,503 A * | 1/1924 | Carswell et al. | ................. | 269/61 |
| 1,600,835 A * | 9/1926 | Manley | ............................ | 269/46 |
| 1,792,612 A * | 2/1931 | Staley | ............................... | 269/55 |
| 1,834,294 A * | 12/1931 | Spahn | .............................. | 269/51 |
| 2,340,707 A * | 2/1944 | Staley | .............................. | 74/425 |
| 2,825,477 A * | 3/1958 | Ross | ................................. | 29/559 |
| 2,985,448 A * | 5/1961 | Hancock | ......................... | 269/15 |
| 2,991,649 A * | 7/1961 | Kinsey | ........................ | 73/116.02 |
| 2,991,994 A * | 7/1961 | Kulp | ................................. | 269/84 |
| 3,172,653 A * | 3/1965 | Fredrickson | .................... | 269/61 |
| 3,834,221 A * | 9/1974 | Swis et al. | .................. | 73/116.02 |
| 4,093,199 A * | 6/1978 | Hefner | ............................. | 269/61 |
| 4,174,627 A * | 11/1979 | Swis et al. | .................. | 73/116.02 |
| 4,530,492 A * | 7/1985 | Bork | ................................. | 269/17 |
| 4,819,922 A * | 4/1989 | Boike | .............................. | 269/45 |
| 4,848,717 A * | 7/1989 | Bevill | ............................ | 248/670 |
| 4,932,628 A * | 6/1990 | Pacheco | ......................... | 248/676 |
| 5,851,007 A * | 12/1998 | Swartzlander et al. | ......... | 269/17 |
| 6,572,092 B2 * | 6/2003 | DuVernay et al. | ............... | 269/71 |
| 6,619,640 B1 * | 9/2003 | Ploski | ............................ | 269/17 |
| 7,726,182 B1 * | 6/2010 | Newlin et al. | ............... | 73/116.02 |
| 7,810,799 B2 * | 10/2010 | McGloghlon | ................... | 269/17 |
| 8,596,627 B2 * | 12/2013 | Lands et al. | .................... | 269/57 |
| 2003/0062663 A1 * | 4/2003 | Fox | .................................. | 269/17 |
| 2014/0259663 A1 * | 9/2014 | Scelsi et al. | ............... | 29/888.01 |

* cited by examiner

*Primary Examiner* — Bradley Duckworth

(74) *Attorney, Agent, or Firm* — Morgan, Lewis & Bockius LLP

(57) ABSTRACT

An engine test device for an engine lubricating system includes: a frame having hinge units at upper front and rear sides thereof and an installing die integrally formed with a front lower portion thereof; a rotary beam hinge-connected to the front and rear hinge units of the frame to be rotated leftward and rightward, and having a fixed beam vertically installed at a central portion thereof; a plate-shaped surface plate rotatably mounted to a center of the fixed beam to fix the engine; and a driving unit configured between the installing die and the rotary beam through a gear unit to control a rotation angle of the rotary beam through control of driving of a motor.

11 Claims, 3 Drawing Sheets

ENGINE TEST DEVICE

CROSS-REFERENCE TO RELATED APPLICATION

The present application claims priority of Korean Patent Application Number 10-2013-0076716 filed Jul. 1, 2013, the entire contents of which application is incorporated herein for all purposes by this reference.

BACKGROUND OF INVENTION

1. Field of Invention

The present invention relates to an engine test device. More particularly, the present invention relates to an engine test device for securing a stability of an engine lubricating system in advance in turn and rapid acceleration/deceleration conditions of a vehicle before an engine is mounted on the vehicle.

2. Description of Related Art

In general, various tests are performed to inspect a performance quality of an engine before the engine is mounted on a vehicle.

In order to perform such a test, an engine test device for securing a stability of an engine lubricating system in advance in turn or rapid acceleration/deceleration conditions of a vehicle is provided.

A conventional engine test device inclines a surface plate mounted on an engine leftward and rightward along two guide rings provided on the left and right sides.

The surface plate and the guide rings are installed on a working die, and the working die is supported by two hydraulic pistons installed at front and rear lower sides thereof.

That is, the surface plate on which an engine is mounted is inclined forward and rearward through operations of the two hydraulic pistons.

Through the engine test device having the above-described configuration, a test for securing a stability of an engine lubricating system in advance before the engine is mounted on the vehicle is performed.

However, the conventional engine test device has large-sized equipment due to the sizes of the guide rings, and the working die is situated at a location distant from the ground by 1.5 m or more, causing a safety problem when the engine is installed.

Further, since the engine is located in the surface plate on the working die, the engine may not be visible from the control center due to its height, making it difficult to monitor the engine.

Further, during a leftward/rightward operation of the surface plate, operators who fix the surface plate at a specific location of the guide ring are necessary.

Further, when the surface plate is operated forward and rearward, at least two hydraulic pistons should be used due to the weight of the equipment, and accordingly, a balance should be accurately maintained when driving of the two hydraulic pistons is controlled.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an engine test device having advantages of securing a stability of an engine lubricating system in advance in turn and rapid acceleration/deceleration conditions of a vehicle before the engine is mounted to the vehicle by rotating the engine leftward, rightward, forward, and rearward by using a rotary beam, a surface plate, and a driving unit.

Various aspects of the present invention provide for an engine test device for an engine lubricating system, the engine test device including: a frame having hinge units at upper front and rear sides thereof and a support beam integrally formed with a front lower portion thereof; a rotary beam hinge-connected to the front and rear hinge units of the frame to be rotated leftward and rightward, and having a fixed beam vertically installed at a central portion thereof; a plate-shaped surface plate rotatably mounted to a center of the fixed beam to fix the engine; and a driving unit configured between the support beam and the rotary beam through a gear unit to control a rotation angle of the rotary beam through control of driving of a motor.

The frame may include: a front frame formed at a front side thereof to have a triangular shape and having the support beam at a front lower portion thereof; a rear frame formed at a rear side thereof to have a triangular shape; and a connecting beam connecting the front and rear frames at a lower portion thereof.

The front frame may include a limit switch for detecting that the rotary beam is inclined at a predetermined angle and outputting a signal is installed at a front upper portion of the front frame.

The front hinge unit of the frame, a front hinge bracket integrally connected to a front end of the rotary beam may be connected to an upper side of the front frame through a hinge shaft, and inclined surfaces may be formed on opposite side surfaces of the front hinge bracket to contact the limit switch if the rotary beam is inclined by a predetermined angle or more.

In the rear frame, stoppers for preventing the rotary beam from being inclined by a predetermined angle or more may be integrally formed with opposite sides of a rear upper side of the rear frame.

In the rear hinge unit of the frame, a rear hinge bracket integrally connected to a rear end of the rotary beam may be connected to an upper side of the rear frame through the hinge shaft, and the rear hinge bracket may have inclined surfaces on opposite side surfaces thereof to be supported by the stoppers if the rotary beam is inclined by a predetermined angle or more.

Fixing pin units may be installed on the rotary beam and the fixed beam so that the fixing pins are automatically inserted into the fixing holes formed at peripheries of the surface plate, respectively.

The fixing pin unit may include an electronic actuator for moving the fixing pins forward and rearward by using an electrical signal.

Fixing members for fixing a lower side of the engine may be installed at corners of an upper surface of the surface plate.

The driving unit may include: a gear unit configured between the support beam and the front hinge unit to adjust a rotation angle of the front hinge unit through a change of the length of the gear unit using a rack/pinion structure in the gear housing; and a motor installed at one side of the gear housing of the gear unit to provide a rotation driving force to the pinion.

The gear unit may include: a gear housing a lower end of which is hinge-connected to one side of the support beam and having a hollow portion and a gear chamber therein; a rack bar slidably inserted into the hollow portion of the gear housing, an upper end of which is hinge-connected to one side of the front hinge unit, and forming a rack along one side surface thereof; and a pinion disposed in the gear chamber of the gear housing and engaged with the rack of the rack bar to receive the rotation driving force of the motor.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
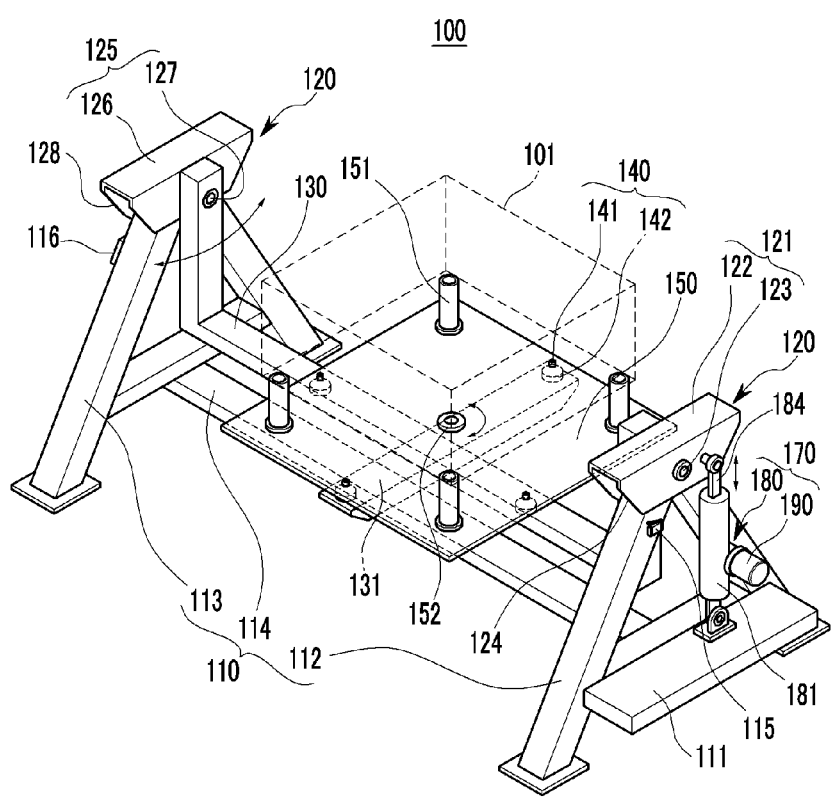
FIG. 1 is a perspective view of an exemplary engine test device according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Meanwhile, since the sizes and thicknesses of the constituent elements shown in the drawings are arbitrarily shown for convenience for description, the present invention is not necessarily limited by the drawings and the thicknesses thereof are enlarged to clearly express various portions and areas.

Further, parts which are irrelevant to the description of the present invention are omitted to clearly describe the various embodiments of the present invention.

Figure 2:
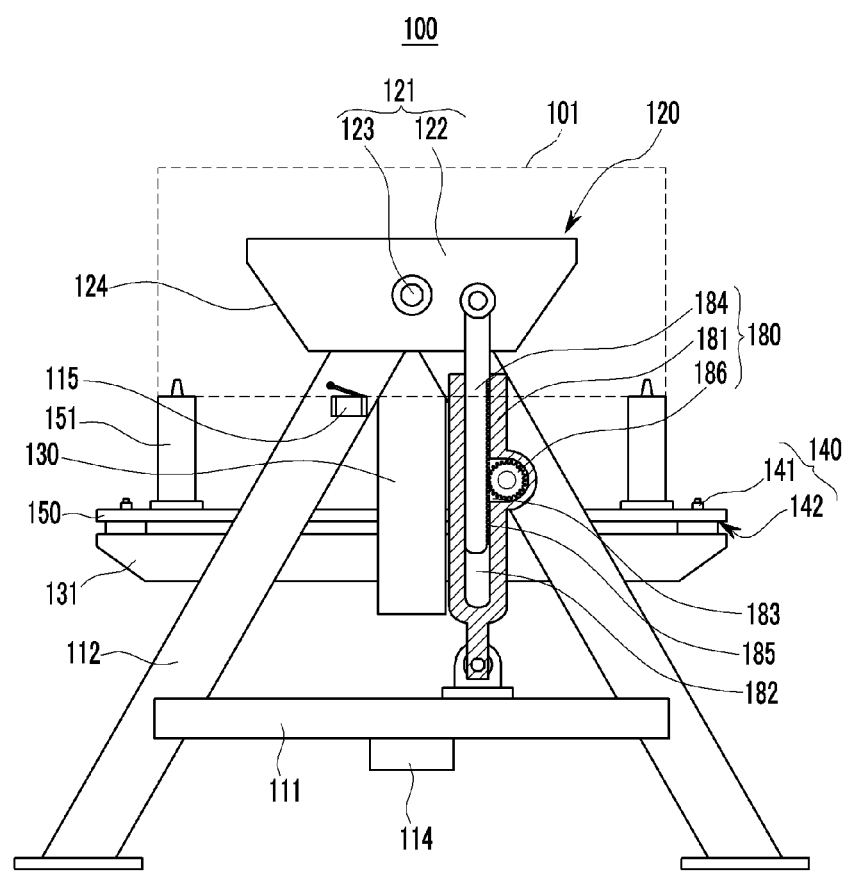
FIG. 2 is a front sectional view of the exemplary engine test device according to the present invention.
Figure 3:
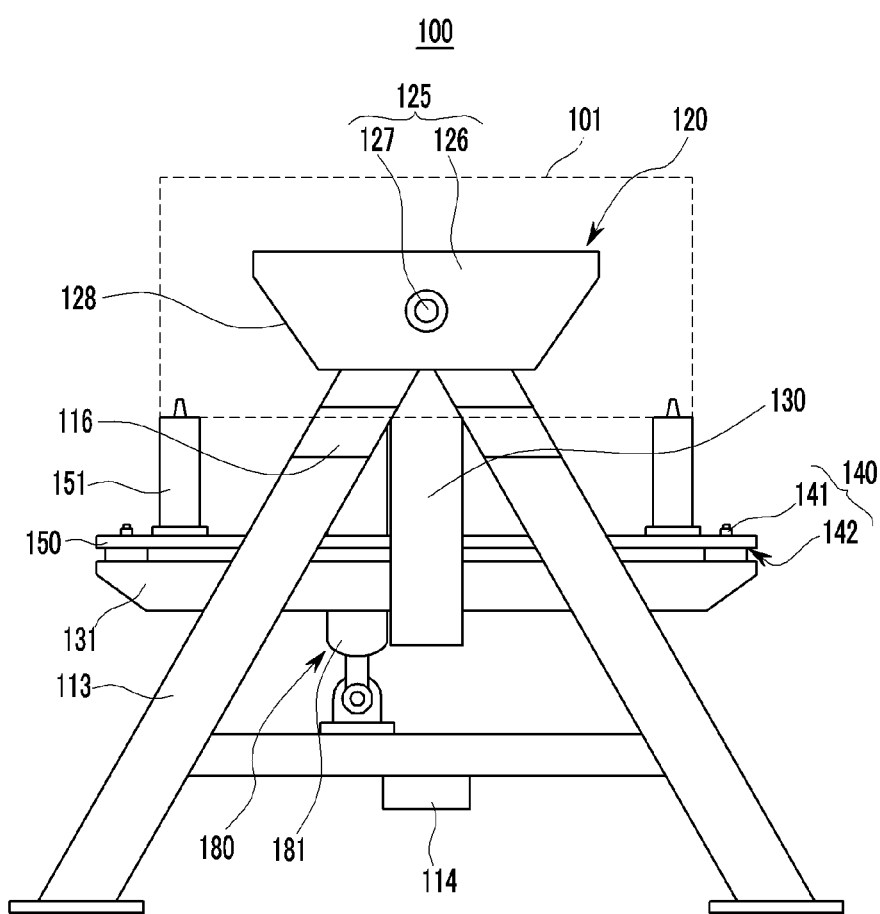
FIG. 3 is a rear view of the exemplary engine test device according to the present invention.

FIG. 1 is a perspective view of an engine test device according to various embodiments of the present invention. FIG. 2 is a front sectional view of the engine test device according to various embodiments of the present invention. FIG. 3 is a rear view of the engine test device according to various embodiments of the present invention.

Referring to FIGS. 1 to 3, the engine test device 100 according to various embodiments of the present invention is provided to secure a stability of an engine lubricating system in advance in turn and rapid acceleration/deceleration conditions of the vehicle before an engine 101 is mounted on the vehicle.

To this end, the engine test device 100 according to various embodiments of the present invention includes a frame 110, a rotary beam 130, a surface plate 150, and a driving unit 170.

First, hinge units 120 are formed at upper front and rear sides of the frame 110, and an support beam 111 is integrally formed with the frame 110 at a front lower portion thereof.

Here, the frame 110 includes a front frame 112, a rear frame 113, and a connecting beam 114.

The front frame 112 is installed at a front side of the engine test device 100 to have a triangular shape, and the support beam 111 is formed at a front lower portion of the front frame 112.

Limit switch 115 for detecting that the rotary beam 130 is inclined at a predetermined angle and outputting a signal to a controller is installed at a front upper portion of the front frame 112.

Here, in a front hinge unit 121 of the frame 110, a front hinge bracket 122 integrally connected to a front end of the rotary beam 130 is connected to an upper side of the front frame 112 through a hinge shaft 123, and inclined surfaces 124 are formed on opposite side surfaces of the front hinge bracket 122 to contact the limit switch 115 if the rotary beam 130 is inclined by a predetermined angle or more.

The rear frame 113 installed at a rear side of the engine test device 100 to have a triangular shape.

Stoppers 116 for preventing the rotary beam 130 from being inclined by a predetermined angle or more are integrally formed with opposite sides of a rear upper side of the rear frame 113.

Here, in a rear hinge unit 125 of the frame 110, the rear hinge bracket 126 integrally connected to a rear end of the rotary beam 130 is connected to an upper side of the rear frame 113 through a hinge shaft 127, and inclined surfaces 128 are formed on opposite side surfaces of the rear hinge bracket 126 to be supported by the stoppers 116 if the rotary beam 130 is inclined by a predetermined angle or more.

The connecting beam 114 connects the front frame 112 and the rear frame 113 at lower portions thereof.

Next, the rotary beam 130 is hinge-coupled to the front hinge unit 121 and the rear hinge unit 125 of the frame 110 to be rotated leftward and rightward, and a fixed beam 131 is vertically installed at a central portion thereof.

Fixing pin units 140 are installed on the rotary beam 130 and the fixed beam 131 so that the fixing pins 141 are automatically inserted into the fixing holes 142 formed at peripheries of the surface plate 150, respectively.

The fixing pin unit 140 includes an electronic actuator for moving the fixing pins forward and rearward by using an electrical signal.

The surface plate 150 has a plate-shape and is rotatably mounted to a center of the fixing beam 131 to fix the engine 101.

Fixing members 151 for fixing a lower side of the engine 101 are installed at corners of an upper surface of the surface plate 150.

In various embodiments of the present invention, the driving unit 170 is configured between the support beam 111 and the rotary beam 130 through a gear unit 180, and controls a rotation angle of the rotary beam 130 through control of driving of a motor 190. The motor 190 is operated by the controller.

Here, the driving unit 170 includes the gear unit 180 and the motor 190.

The gear unit 180 is configured between the support beam 111 and the front hinge unit 121 to adjust a rotation angle of the front hinge unit 121 through a change of the length of the gear unit 180 using a rack/pinion structure in the gear housing 181.

The gear unit 180 includes a gear housing 181, a rack bar 184, and a pinion 186.

A lower end of the gear housing 181 is hinge-coupled to one side of the support beam 111, and a hollow portion 182 and a gear chamber 183 are formed in the interior of the gear housing 181.

The rack bar 184 is slidably inserted into the hollow portion 182 of the gear housing 181, and an upper end of the rack bar 184 is hinge-coupled to one side of the front hinge unit 121 and a rack 185 is formed along one side of the rack bar 184.

The pinion 186 is disposed in the gear chamber 183 of the gear housing 181 to be engaged with the rack 185 of the rack bar 184, and receives a rotation driving force of the motor 190.

The motor 190 is installed at one side of the gear housing 181 of the gear unit 180 to provide a rotation driving force to the pinion 186.

That is, the engine test device 100 according to the present invention transmits a rotation driving force generated through an operation of the motor 190 to the pinion 186 of the gear unit 180, and the pinion 186 receives a rotation driving force of the motor 190 to be rotated.

The rack bar 184 engaged with the pinion 186 is slid upward and downward in the gear chamber 183 of the gear housing 181 by a rotating force of the pinion 186.

Then, the front hinge unit 121 hinge-connected to an upper end of the rack bar 184 is moved leftward and rightward through the upward and downward slide movement of the rack bar 184 and the rotary beam 130 connected to the front hinge unit 121 is rotated leftward and rightward.

According to the operation, the engine 101 fixed to a fixing die 151 of the surface plate 150 is tested for a stability of the engine lubricating system through a leftward and rightward movement of the rotary beam 130.

Meanwhile, the surface plate 150 rotatably mounted to a center of the fixing beam 131 is rotated by 360°, and is rotated clockwise in unit of 90°. the surface plate 150 is rotated with respect to a rotation shaft 152

Here, the fixing pin unit 140 fixes and releases a location of the surface plate 150 whenever the surface plate 150 is rotated clockwise in unit of 90° from a center of the fixing beam 131 through the fixing pin 141 moved forward and rearward and the fixing hole 142.

That is, if the surface plate 150 is rotated clockwise by 90° with respect to the front frame 112, a direction of the engine 101 is changed from the leftward-rightward direction to the forward-rearward direction and a stability of the engine lubricating system for the forward and rearward direction of the engine 101 can be tested.

When an operation of the motor 190 is stopped, the limit switches 115 installed in the front frame 112 and the stoppers 116 installed in the rear frame 113 prevent the front hinge unit 121 and the rear hinge unit 125 connected to the rotary beam 130 from being inclined by a maximum operation angle (for example, 45 degrees) or more.

Thus, the engine test device 100 according to various embodiments of the present invention rotates the engine 101 leftward, rightward, forward, and rearward by using the frame 110, the rotary beam 130, the surface plate 150, and the driving unit 170 to secure a stability of the engine lubricating system in advance in turn and rapid acceleration/deceleration conditions of the vehicle before the engine 101 is mounted to the vehicle.

Further, by reducing the size of the surface plate and lowering an installation height of the surface plate 150, the operator can easily install the engine on the surface plate 150 while standing on the ground, an additional operation for the engine 101 can be easily performed, and a test situation of the engine 101 can be monitored even in a control center.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine test device for an engine lubricating system, the engine test device comprising:
    a frame including hinge units at respective upper front and rear sides thereof, and including a support beam integrally formed with a front lower portion thereof;
    a rotary beam hinge connected to the front and rear hinge units of the frame for rotating leftward and rightward, and including a fixed beam vertically installed at a central portion thereof;
    a plate-shaped surface plate rotatably mounted to a center of the fixed beam to support the engine; and
    a driving unit configured to control a rotational angle of the rotary beam with respect to the support beam, the driving unit including a gear unit driven by a motor.

2. The engine test device of claim 1, wherein the frame comprises:
    a front frame formed at a front side thereof to have a triangular shape and having the support beam at a front lower portion thereof;
    a rear frame formed at a rear side thereof to have a triangular shape; and
    a connecting beam connecting the front and rear frames at a lower portion thereof.

3. The engine test device of claim 2, wherein the front frame comprises a limit switch for detecting that the rotary beam is inclined at a predetermined angle and outputting a signal, and the limit switch is installed at a front upper portion of the front frame.

4. The engine test device of claim 3, wherein in the front hinge unit of the frame, a front hinge bracket integrally connected to a front end of the rotary beam is connected to an upper side of the front frame through a hinge shaft, and inclined surfaces are formed on opposite side surfaces of the front hinge bracket to contact the limit switch if the rotary beam is inclined by at least a predetermined angle.

5. The engine test device of claim 2, wherein in the rear frame, stoppers for preventing the rotary beam from being inclined by at least a predetermined angle are integrally formed with opposite sides of a rear upper side of the rear frame.

6. The engine test device of claim 5, wherein in the rear hinge unit of the frame, a rear hinge bracket integrally connected to a rear end of the rotary beam is connected to an upper side of the rear frame through the hinge shaft, and the rear hinge bracket has inclined surfaces on opposite side surfaces thereof to be supported by the stoppers if the rotary beam is inclined by at least a predetermined angle.

7. The engine test device of claim 1, wherein fixing pin units are installed on the rotary beam and the fixed beam so that the fixing pins are automatically inserted into fixing holes formed at peripheries of the surface plate, respectively.

8. The engine test device of claim 7, wherein the fixing pin unit comprises an electronic actuator for moving the fixing pins forward and rearward by using an electrical signal.

9. The engine test device of claim 1, wherein fixing members for fixing a lower side of the engine are installed at corners of an upper surface of the surface plate.

10. The engine test device of claim 1, wherein the driving unit comprises:
   the gear unit configured between the support beam and the front hinge unit to adjust a rotation angle of the front hinge unit through a change of the length of the gear unit using a rack/pinion structure in the gear housing; and
   a motor installed at one side of the gear housing of the gear unit to provide a rotation driving force to the pinion.

11. The engine test device of claim 10, wherein the gear unit comprises:
   a gear housing a lower end of which is hinge-connected to one side of the support beam and having a hollow portion and a gear chamber therein;
   a rack bar slidably inserted into the hollow portion of the gear housing, an upper end of which is hinge-connected to one side of the front hinge unit, and forming a rack along one side surface thereof; and
   a pinion disposed in the gear chamber of the gear housing and engaged with the rack of the rack bar to receive the rotation driving force of the motor.

\* \* \* \* \*